Patented Apr. 10, 1951

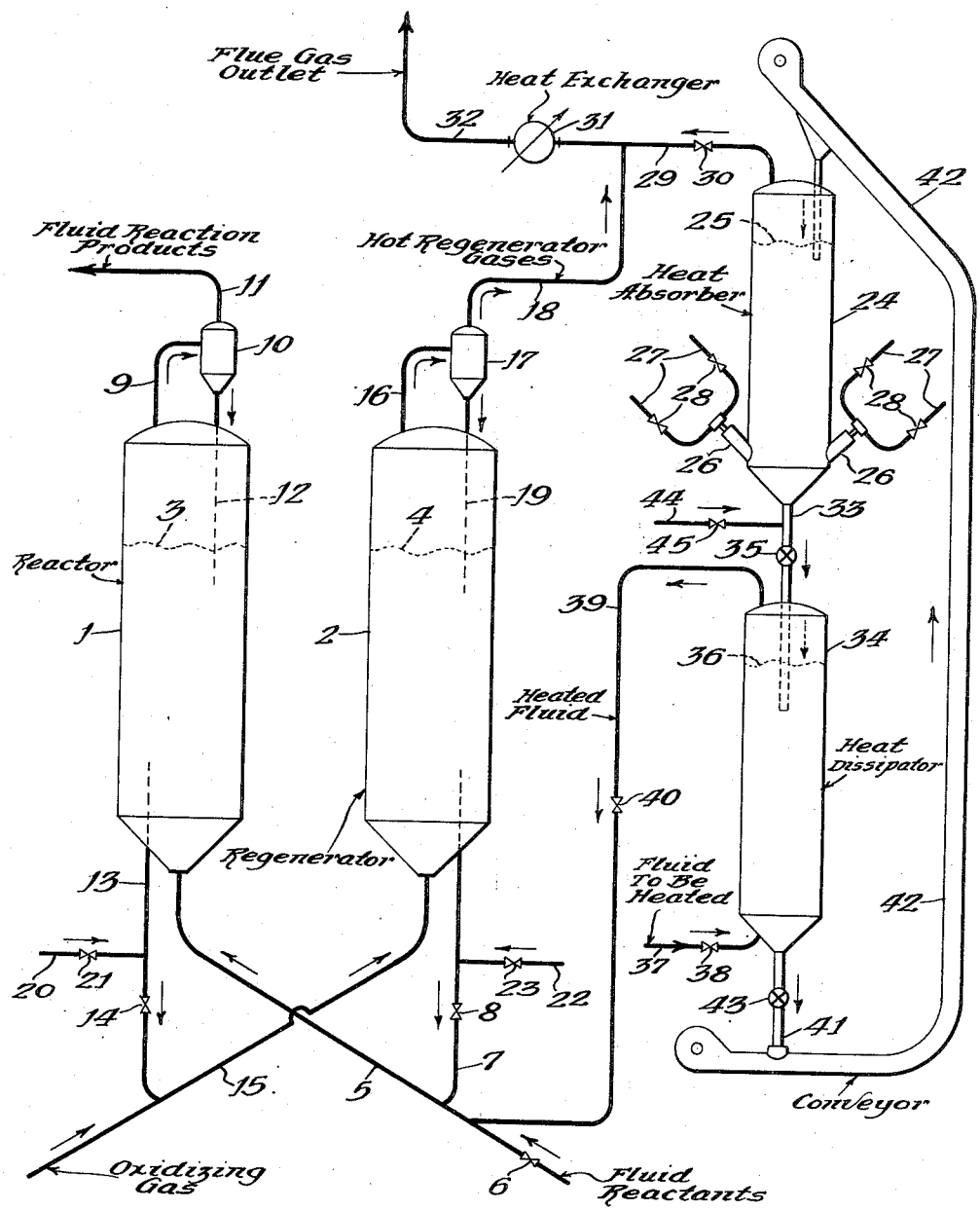

2,548,030

UNITED STATES PATENT OFFICE 2,548,030

APPARATUS FOR HEATING FLUIDS TO HIGH TEMPERATURES

Frederick W. Leffer, Riverside, Ill., assignor to Universal Oil Products Company, Chicago, Ill., a corporation of Delaware Application March 13, 1947, Serial No. 734,396

1 Claim. (Cl. 263—19)

This application is a continuation-in-part of my co-pending application Serial No. 607,889, filed July 30, 1945, now Patent No. 2,422,791, June 24, 1947, which in turn is a continuation-in-part of application Serial No. 480,357, filed March 24, 1943, and which has issued March 19, 1946, as Patent No. 2,396,709.

This invention is directed to an improved method and apparatus for heating fluids to high temperatures by means of continuously passing a sub-divided or granular refractory heat retentive material from a heating and heat absorbing zone to a heat dissipating zone, wherein the refractory material gives up heat to a fluid stream charged therethrough. The invention further provides means for supplying heat to a reactant stream having insufficient heat to carry out a desired endothermic conversion process, or for supplying heat to aid in the endothermic conversion of a fluid retactant stream which is converted in the presence of a sub-divided solid catalytic material having insufficient heat content to furnish all of the heat required for the desired endothermic reaction.

It is therefore a principal object of this invention to provide an improved and continuous means for heating a fluid stream to a desired high temperature.

It is also an object of the invention to provide means for supplying heat necessary for the endothermic conversion of a reactant stream in the presence of a solid contact material, wherein the latter has insufficient heat content to provide all of the endothermic heat necessary.

It is a still further object of the invention to provide an improved apparatus suitable for heating a fluid stream continuously to a high temperature in an indirect manner.

It has been observed that in many instances, when carrying out hydrocarbon conversion reactions of a highly endothermic nature, such as for eaxmple in the production of acetylene, butadiene, and the like, from more highly saturated hydrocarbons, there is not always a sufficient deposit of combustible contaminants on the contact material during the conversion to furnish all the heat required for conducting the endothermic reaction by the heat imparted to the catalyst during combustion of the contaminants thereon. It has further been observed that under the foregoing conditions, the combustion of extraneous fuel in the catalyst regeneration step in quantities adequate to impart to the regenerated catalyst an amount of heat sufficient to satisfy the heat requirement of the endothermic conversion reaction in the reaction zone rarely solves the problem of process heat supply satisfactorily, since many of the catalysts of the currently used type are easily overheated to temperatures that result in the deactivation of the catalyst and leave the same in a permanently impaired condition.

The method of heating a fluid to high temperatures by means of a moving bed of sub-divided heat retentive material is of particular value in overcoming the above mentioned difficulties and in eliminating tubular types of exchangers or checker-work types of regenerative heaters, and the like. In operating in accordance with the present invention as more fully defined below, the sub-divided solid heat retentive material is heated, as it moves as a compact mass through a confined zone, by means of hot combustion gases resulting from burning fuel in a combustion space adjacent and in open communication with the lower portion of the confined zone. The material is transferred in heated state to a separate confined zone through which it moves as a compact mass in direct contact with a fluid to be heated and thus dissipates heat to the latter, and the resulting cooled contact material being continuously returned from the last named zone to the first named zone establishes a closed cycle through which it is continuously circulated. The heat retentive material may be a calcined shale, quartz, sand, fire-clay particles, refractory, carborundum, or the like, having generally a high heat absorbent quality and resistance to deterioration at high temperatures.

This invention is, for example, of considerable value in connection with the catalytic conversion of hydrocarbons by a continuous process, such as in some of the "fluidized" catalytic conversion processes, wherein the hydrocarbon conversion charge is contacted in a reaction zone with subdivided catalyst particles at reaction temperatures for a sufficient time to effect the desired endothermic conversion, while a stream of contaminated catalyst particles is continuously withdrawn from the reaction zone and regenerated in a confined regenerating zone at a temperature substantially below the catalyst deactivation temperature, and hot regenerated catalyst is continuously returned to the reaction zone at a temperature and in a quantity insufficient to furnish all of the heat required for the endothermic reaction.

The features of the invention also make it applicable and of value to the endothermic conversion of hydrocarbons to produce acetylenes, dienes, and the like, which are of considerable value. Such products may be produced pyrolytically by high temperature short time contacts, or in the presence of catalysts increasing the yields of the desired product. For example, acetylene may be produced from a hydrocarbon stream by subjecting the latter for a short time to a temperature of 1500° F. or higher, the high temperature requirement being supplied by a stream of an inert fluid such as superheated steam, carbon dioxide, nitrogen or other relatively inert fluid medium which may be superheated and also act as an effective diluent in the conversion reaction.

One specific embodiment of the process for heating fluids to a high temperature according to this invention provides for continuously passing a granular refractory heat retentive material downwardly in series through an upper enlarged absorption zone, a stripping zone of more restricted cross section and a lower enlarged heat dissipating zone in vertical alignment, maintaining granular material in each of the upper and lower zones in a compact bed moving downardly along an unobstructed path through at least a major portion of each of said enlarged zones, returning granular material from the bottom of the lower zone to the top portion of the upper zone, burning fuel in combustion zones adjacent to and in open communication with the lower portion of the upper heat absorption zone and causing resultant hot combustion gases to pass directly into and upwardly through the moving compact bed within said upper zone, stripping entrained volatile and gaseous components from the heated granular material leaving the upper zone by contacting the same during its downward passage through the stripping zone with a stripping fluid medium, supplying fluid to be heated to the lower heat dissipating zone and passing it upwardly through the downwardly moving compact bed therein and withdrawing the resultant high temperature fluid stream free of the granular heat retentive material from the upper portion of the lower zone.

In modifications of the above specific embodiment of the process, the operation may be such as to heat a fluid reactant stream to a high temperature by passing it through the lower heat dissipating zone in direct contact with the granular heat retentive material; alternatively, a relatively inert fluid stream or a fluid diluent stream, may be charged to the lower heat dissipating zone wherein it is directly contacted with the hot heat retentive material and then discharged therefrom in a highly heated state to become subsequently commingled with a fluid reactant stream, thereby furnishing the necessary endothermic heat for conversion of the latter stream.

In a still further embodiment of the invention, wherein an endothermic conversion of a fluid reactant at an elevated temperature is carried out in the presence of a solid contact material, such as catalyst, having insufficient heat content for providing all of the heat required for the endothermic reaction, the improved method of operation comprises passing a granular heat retentive material downwardly in series through an upper enlarged heat absorption zone, a stripping zone of more restrictive cross section and a lower enlarged heat dissipating zone each in vertical alignment, maintaining the granular material in a downwardly moving compact bed free of obstructions in each of the upper and lower zones and returning granular material from the bottom portion of the lower zone to the top portion of the upper zone, burning fuel in combustion zones adjacent to and in open communication with the lower portion of the upper zone and causing resultant combustion gasses to pass from the combustion zones directly into and upwardly through the moving compact bed in the upper zone, stripping entrained volatile and gaseous components from the heated granular material leaving the upper zone by contacting the same during its downward passage through the stripping zone with a stripping fluid, supplying a heat carrying fluid at a relatively low temperature to the lower portion of the lower zone and heating it during its upward passage through the moving bed within the lower zone, separating heat carrying fluid from the granular material within the upper portion of the lower heat dissipating zone and supplying a stream of the resultant hot heat carrying fluid at a temperature above that required for the conversion within the reaction zone to the latter at a rate sufficient to maintain therein the endothermic conversion reaction.

The accompanying diagrammatic drawing illustrates one specific form of the apparatus in which the improved heating process may be successfully conducted, and in combination therewith a fluidized conversion unit wherein fluid reactants are converted in the presence of a contact material to provide valuable products. The following description of the apparatus and flow will clarify the operation and point out further advantageous features of the process and apparatus comprising this invention.

Referring now to the drawing, there is indicated a reactor 1 and a regenerator 2, each of which comprises a vertically disposed cylindrical chamber and within each there is a fluidized bed of sub-divided solid contact material, such as a catalyst. The concentraton of solid particles is materially less in the upper portion of each of the chambers or vessels than in the lower portion, and the approximate line of demarcation between the light upper phase and the lower dense phase is indicated by the line 3 in the reactor and the line 4 in the regenerator.

Fluid reactants to be converted may be supplied to the lower portion of the reactor 1 by means of line 5, having control valve 6. The reactant stream may elevate sub-divided solid particles through line 5 which have been discharged through line 7 and valve 8 and which are supplied as reactivated contact material from the regenerator 2. The fluid reac.ants and the sub-divided solid particles enter the lower portion of the reactor 1 and are contacted therein in a fluidized state of hindered settling whereby the fluid stream prevents the particles from settling by gravity and maintains them in a turbulent state. The resulting reaction products and gases pass upwardly through the reactor at a greater velocity than the bulk of the solid particles and thus enter the light upper phase zone at the top of the chamber and are discharged therefrom with a small amount of entrained solid particles through line 9 to a separator 10. The separator 10 may be of a centrifugal type suitable for collecting and returning separated solid particles to the reaction zone while simultaneously discharging reaction products substantially free of solid particles. The reaction products may be carried out to suitable recovery or fractionating means by way of line 11 and the recovered solid particles are returned to the dense phase bed of the reaction zone by means of return line 12.

In the case of hydrocarbon reactants, the conversion process in addition to producing desired relatively light products, also results in the deposition of heavier conversion products of a carbonaceous nature on the particles of subdivided contact material, or catalyst. The contaminated particles are withdrawn from the reactor 1 through a standpipe 13 having a control valve 14 such that they may be transferred to the regenerator 2 for removal of the contaminating carbonaceous material in a reactivation operation. Such reactivation may be normally obtained by burning the carbonaceous material from the solid particles with an oxidizing gas stream. In the drawing, an oxygen-containing stream is charged through line 15 to the lower portion of the regenerator 2 and serves to carry with it the contaminated particles which are discharged from the dense phase bed of the reactor through the line 13. The oxidizing gas stream fluidizes the contaminated contact material within the dense phase region in the lower portion of the regenerator 2, in a manner similar to that effected in the reactor 1, and the contact material is reactivated by the burning of carbonaceous contaminants from the solid particles and it is thus made ready for recirculation and reuse in the reactor 1. Regenerated contact material is withdrawn from the dense phase zone of the regenerator 2 by way of standpipe 7 and it subsequently enters line 5 and is carried to the reactor 1 as has been noted above. The gaseous regeneration and combustion products from the regenerator 2 are discharged therefrom with a small amount of entrained contact material through line 16 into a separator 17, which like separator 10 may be of the centrifugal type. The hot combustion gases separated from the particles may be discharged from separator 17 through line 18, while the separated particles themselves may be returned through the dropleg 19 to the dense phase zone within the regenerator.

To prevent the transfer of fluid reactants or hydrocarbons and vaporous or gaseous conversion products from the reactor 1 to the regenerator 2, the descending column of solid particles within line 13 is substantially stripped of the hydrocarbons and conversion products by introducing relatively small quantities of a substantially inert gas, such as steam, into the standpipe through a line 20 having a control valve 21. In a similar manner steam or other suitable stripping gas is introduced through line 22 and valve 23 into the standpipe 7 to substantially strip the column of sub-divided solid material of oxidizing and combustion gases which have been entrained from the regenerator.

The sub-divided solid contact material used in the reactor 1 and the regenerator 2 as hereinbefore noted, may be a catalyst which is effective in promoting the desired conversion reaction within the reaction zone. The catalyst may be of a powdered or pulverized or microspherical type, which is capable of withstanding the temperature and operating conditions within the fluidized conversion operation without its deactivation or deterioration. For example, in the dehydrogenation of a hydrocarbon gas stream a finely divided aluminachromia catalyst may be used to effect substantial yields of butadiene as a desired product.

In accordance with the operation of the present invention, it may be found that the reactivated contact material being returned to the reactor 1, although carrying a substantial quantity of heat, will have insufficient heat capacity to provide all of the endothermic heat required within the reaction zone to effect the desired conversion of the fluid reactant stream and it may therefore be desirable to supply additional necessary heat by means of supplying heat from a heat carrying fluid which in turn is heated to a high temperature in an accompanying heat producing unit. The heat producing unit of this invention has a heat absorbing chamber 24 which permits the supply of readily controlled amounts of heat to a relatively compact mass of sub-divided granular material, rather than a fluid mass. The compact bed is indicated by the line 25 and during operation it moves continuously downward through the chamber 24. Structural members and other obstructions are avoided within the chamber 24 at least along the major portion of its height in order to assure that the compact bed may travel therethrough as an uninterrupted mass wherein substantially all particles travel at a uniform speed and channelling of either ascending fluid or descending particles is precluded while the compact bed is not disturbed, broken up, or reshaped until it reaches the bottom portion of the chamber.

The combustion chambers 26 are positioned adjacent the lower end of the heat adsorbing chamber 24 and are in direct communication therewith such that hot combustion gases may pass upwardly through the vessel 24 countercurrently to the descending compact granular bed. Lines 27 and valves 28 provide means for supplying fuel and air to the combustion chambers 26. The partially cooled combustion gases, after giving up heat to the heat retentive mass 25, may be discharged from the upper portion of the heat absorber 24 through gas outlet line 29 having a control valve 30 and may become mixed with the regenerator gases discharged through line 18. The commingled stream of combustion gases may then be passed to a waste heat boiler or heat exchanger 31 prior to being discharged to the atmosphere through a flue gas stack 32.

The hot granular heat retentive material is continuously directed from the lower portion of the chamber 24 through a conduit, or elongated passageway 33 and into a lower elongated and cylindrical vessel 34, which comprises a heat dissipating chamber. The flow of granular material from chamber 24 to chamber 34 may be controlled by suitable means, such as a slide valve or star feeder, indicated at 35 in the conduit 33, although such flow regulating means may not ordinarily be required.

A bed of heat retentive solid material is maintained in vessel 34, the approximate upper limit of the bed being indicated by line 36, and it moves downwardly through the vessel countercurrent to and in direct contact with a fluid stream which is to be heated within this zone. Obstructions are avoided within the vessel 34 to the same extent and for the same purpose as already described with reference to vessel 24. The fluid to be heated is supplied to the lower portion of the vessel 34 through line 37 and valve 38 and may comprise water, steam, carbon dioxide, hydrogen, a gas mixture, or other suitable fluid which is inert or which acts as a diluent with respect to the desired conversion process for which heat is being supplied; or alternatively, the stream may comprise a portion or all of the reactants to be converted in the reactor.

In the preferred embodiment of the invention, a bed of sub-divided solid heat retentive material is passed through the vessel 34, as in the other vessel 24, in a relatively compact mass of solid particles with little if any fluidization. The solid particles and the fluid undergoing heating flow through the vessel 34 in generally countercurrent directions, and the sub-divided heat retentive material is discharged at a relatively low temperature from the lower portion of the vessel, while the heated fluid is discharged from the upper portion of the vessel at a temperature closely approaching that at which the heated solid material is supplied thereto from the vessel 24. In the particular embodiment shown, the highly heated fluid is discharged from the upper portion of the heat dissipating zone 34 through line 39 and valve 40 into line 5, wherein it may assist in fluidizing and transporting to the reactor 1 the solid catalyst particles supplied to line 5, through standpipe 7, from the regenerator.

The granular heat retentive material, from which heat has been abstracted in vessel 34, is directed from a lower portion of this zone through a conduit 41 to a suitable continuous conveyor indicated at 42, whereby the solid particles may be returned to the bed thereof maintained in the heat absorbing vessel 24 to provide a continuous closed cycle through vessel 24, passageway 33, vessel 34, and through the conveyor 42 back to vessel 24. When desired, a suitable flow regulating means 43, like that indicated at 35, may be provided in the conduit 41.

It is usually desirable to prevent the carrying or passage of gases from the lower portion of the heat absorber 24 into the reaction zone, since these gases may contain unused oxygen which would interfere with the desired conversion of the fluid reactant stream, or in any event would contaminate the reactants and conversion products. To accomplish this, steam or other relatively inert gas in introduced through line 44 and valve 45 into the column of solid heat retentive particles passing through the elongated passageway 33, connecting vessels 24 and 34. The inert gas stream from line 44 passes upwardly through the column and substantially strips the same of any entrained combustion gases. A star feeder at 35 can be used to prevent the passage of fluid which is to be highly heated into the upper contact chamber 24; however, the height and density of the column of solid particles in line 33 is normally sufficient to preclude the flow of heated fluid from the lower vessel 34 to the upper vessel 24 since these vessels are preferably operated at pressures which result in a balanced pressure in the passageway 33 so that the absence of any substantial pressure differential between the two sides of the valve or star feeder 35 permits the fluid stripping medium supplied to this passageway to form an effective seal between the fluids in the vessels above and below it.

In order to preclude any material loss of heat from the solid particles during the stripping operation, the stripping fluid is preferably preheated to a temperature equal to or approaching that of the solid particles entering the passageway 33. In many cases, and particularly when the fluid heated in vessel 34 is an inert or diluent fluid as hereinbefore referred to, it is expedient to withdraw a minor portion of the highly heated fluid from the top of vessel 34 or line 39 and pass this portion without any intentional intervening cooling through line 44 as stripping fluid into the passageway 33.

The closed cycle of the granular heat retentive material through the chamber 24, stripper 33, chamber 34 and conveyor conduit 42 can be operated under any desired pressure, substantial equalization of the pressures at the inlet and outlet of the stripper or passageway 33 being readily attained by adjustment of the control valves 30 and 40, respectively, in the lines 29 and 39. When operating this cycle under superatmospheric pressure, fuel and air or oxygen for combustion are supplied at suitable superatmospheric pressures through the lines 27 and valves 28. Generally, this closed cycle is maintained at a pressure sufficiently high to cause the flow of highly heated fluid from the top of chamber 34 to and through the reaction system without the aid of any intervening compressing or pumping means.

In the high temperature conversion of normally gaseous or liquid hydrocarbons in, for example, a dehydrogenating process, the stream supplied to vessel 34 through line 37 may be a mixture of the hydrocarbon reactants in either vaporized or liquid state with steam or water, or it may be the hydrocarbon reactants alone or steam or other relatively inert fluid alone.

In another example, such as the pyrolytic conversion of low molecular weight hydrocarbons to acetylene, it may be advisable to superheat steam or other diluent gas such as carbon dioxide or hydrogen in the contact chamber 34 and to mix the highly heated stream thus obtained with a pre-heated hydrocarbon gas stream at a point in proximity to the upper portion of the contact chamber 34 or in a suitable contacting chamber, such that the hydrocarbon is contacted for a short time with the highly heated heat carrying fluid and thereby a substantially high yield of the desired product is obtained. By the use of suitable granular heat retentive material, the heating unit of this invention is capable of producing very highly heated fluid streams. For example, with a bed of carborundum, alundum, zirconia, or other like types of refractory temperatures up to 3000° F. or more may be attained. It is therefore not intended to limit this invention to use in any particular conversion process, for it is obvious that many high temperature pyrolytic or catalytic conversions may be effected with the aid of this indirect method and means of heating a fluid stream.

I claim as my invention:

Apparatus for heating fluids to high temperatures which comprises in combination an upper heat absorption chamber disposed in vertical alignment with a lower heat dissipating chamber, an elongated down-stream passageway connecting the bottom of said upper chamber with the top of said lower chamber and having a substantially more restricted cross-section than said chambers, an up-stream passageway connecting the bottom of said lower chamber with the upper portion of said upper chamber and being adapted to circulate granular particles of solid heat retentive material from the bottom of the lower chamber to the upper portion of the upper chamber, each of said chambers being substantially free of internal obstructions along at least the major portion of its height, whereby to permit a compact bed of granular heat retentive material to travel from a level in the upper portion of each chamber downwardly through at least a major portion thereof in an unobstructed path of substantially the same cross-section as that of the respective chamber, combustion chambers adjacent to the lower periphery of said upper chamber and in open communication with this upper chamber, means for supplying fuel and oxygen for combustion to said combustion chambers, an outlet for combustion gases at the upper portion of the upper chamber, an inlet for supplying fluid to be heated at the lower portion of the lower chamber, an outlet for heated fluid at the top portion of said lower chamber, and an inlet at said down-stream passageway for supplying a stripping fluid thereto, said down-stream passageway extending downwardly into the upper portion of the lower chamber to below the level of said outlet for heated fluid.

FREDERICK W. LEFFER.

REFERENCES CITED

The following references are of record in the file of this patent:

UNITED STATES PATENTS

| Number | Name | Date |
|---|---|---|
| 1,977,684 | Lucke | Oct. 23, 1934 |
| 2,239,801 | Voorhees | Apr. 29, 1941 |
| 2,274,003 | Sheppard | Feb. 24, 1942 |
| 2,387,378 | Wolk | Oct. 23, 1945 |
| 2,393,636 | Johnson | Jan. 29, 1946 |
| 2,422,791 | Leffer | June 24, 1947 |